B. C. KNUDSEN.
ANTIRATTLING STRUCTURE FOR VEHICLES AND THE LIKE.
APPLICATION FILED SEPT. 28, 1915.
1,178,860. Patented Apr. 11, 1916.
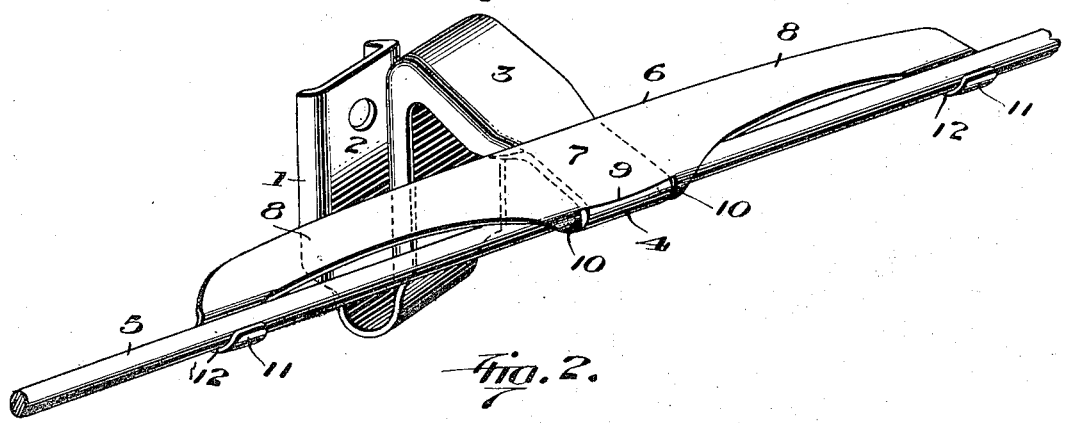
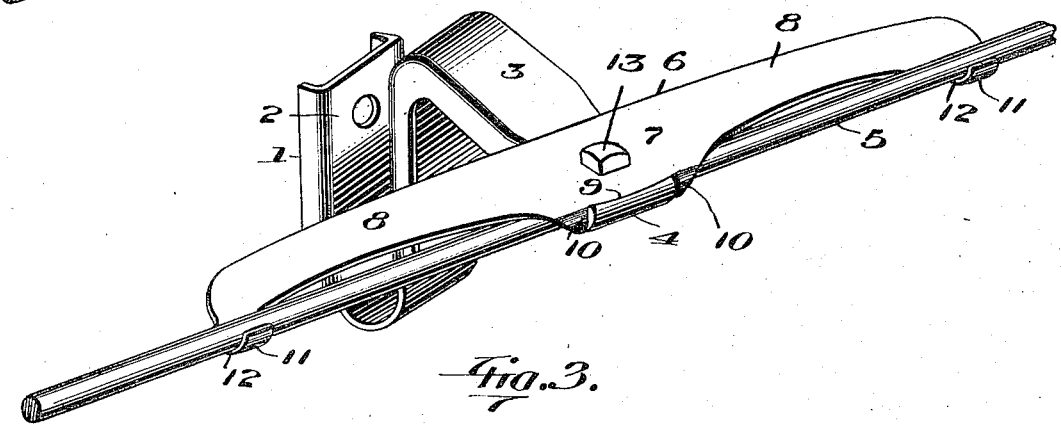
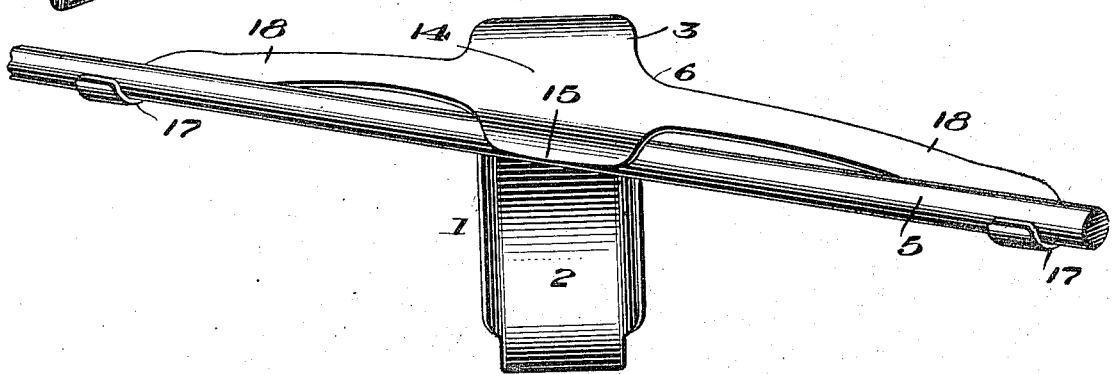
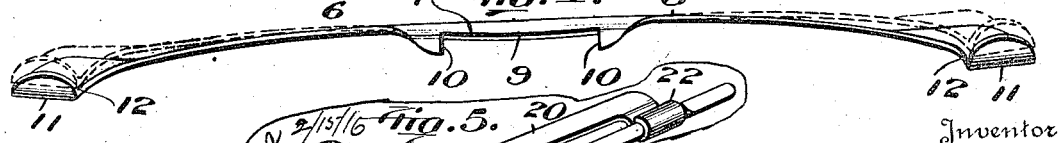
Witnesses
Philip E. Barnes
James Atkins
Inventor
Becker C. Knudsen
By Edmund H. Parry
Attorney

UNITED STATES PATENT OFFICE.

BECKER C. KNUDSEN, OF CLINTON, IOWA.

ANTIRATTLING STRUCTURE FOR VEHICLES AND THE LIKE.

1,178,860.  Specification of Letters Patent.  Patented Apr. 11, 1916.

Application filed September 28, 1915. Serial No. 53,067.

*To all whom it may concern:*

Be it known that I, BECKER C. KNUDSEN, a citizen of the United States, residing at Clinton, in the county of Clinton and State of Iowa, have invented certain new and useful Improvements in Antirattling Structures for Vehicles and the like, of which the following is a specification, reference being had therein to the accompanying drawing.

This invention relates broadly to anti-rattling devices and more especially to a structure for engaging with the brake-operating rod of an automobile whereby rattling and consequent wear thereof are prevented.

The primary object of the invention, in one aspect, is to provide a simple and inexpensive, but none the less efficient device adapted to have a holding engagement with a brake-operating rod of an automobile and so constructed that it may conveniently and quickly be applied thereto without the use of tools and without necessity of removing any of the permanent parts of the automobile.

Another object is to provide a detachable clip which, by reason of its peculiar construction and design, is adapted to be most effective as an anti-clip and which may readily be placed in position and removed whenever occasion demands.

Another object within the contemplation of my invention is so to construct the clip that, while it has an effective function of preventing the rattling of a brake rod, yet, at the same time, it permits free movement thereof and conforms to the design of the rod.

The invention seeks in general to provide an anti-rattling structure which is particularly adapted for use in connection with the brake-operating rod of an automobile—this being subjected to a very considerable and constant vibration—and which structure, from an operative standpoint, has, in practical use, been demonstrated to possess a high degree of efficiency and durability and which, structurally considered, is of great simplicity.

Other objects and advantages of the structure will be obvious from the annexed drawings, while others will be made to appear in the following description.

The invention resides broadly in the features of construction and aggroupment of the parts, and in the form thereof, all as exemplified in the construction hereinafter set forth, and the scope of application of which will be indicated in the claims hereto appended.

That the invention may readily be comprehended, drawings illustrating some of the many possible embodiments and utilizations of the same are hereto appended as a part of this disclosure; it being manifest that other possible embodiments and utilizations (employing the underlying principles of my invention) fall within the spirit thereof and within the objects contemplated thereby.

In these drawings: Figure 1 is a view in perspective of an anti-rattling device constructed in accordance with one embodiment thereof; Fig. 2 is a similar view of another embodiment; Fig. 3 is a similar view of still another embodiment; and Fig. 4 is a view in front elevation of the rod-engaging clip forming an essential part of the structure.

Referring to the drawings, and to Figs. 1 to 4 thereof, it will be noted that the reference-character 1 designates a bracket. This may be of any appropriate form, material and dimensions. In this instance, it is shown as comprising a V-shaped portion 2—which is adapted to be bolted or otherwise secured to a part of the body or other portion of an automobile—and an angular clip-sustaining portion 3. In the form of structure shown in Figs. 1 and 2, the angular-portion is provided with a eye or bearing 4. Through this extends a slidable member 5 which, in the present instance, is a brake-operating rod of any required dimensions and form. Mounted on, secured to, or formed integral with said angular portion (as the case may be) is a rod-engaging member 6 which, as herein exemplified, is elongated and constructed of resilient material, such as spring steel. In the several figures of the drawings, this clip is shown sustained by the bracket in different ways: For instance, in Fig. 1, the clip is unsecured to the angular portion of the bracket, but rests thereupon and is sustained thereby. In Fig. 2, the clip is shown as bolted to the angular portion. In Fig. 3, it is shown as formed integral therewith.

The clip comprises a body-portion 7 forming its central part and two oppositely-extended end-portions 8, 8. The central, body-portion is enlarged transversely and at one edge is curved downwardly and cut-out, as at 9, so as to provide a pair of pendant shoulders 10 adapted to abut against the sides of the bearing 4 of the bracket. The end-portions 8, preferably and as shown, incline downwardly and have their extremities angulated to present sections 11 which are bent to provide curved rod-receiving surfaces 12. As aforementioned, the clip, or at least each end portion, is of resilient material so that, when the rod 5 is positioned in said rod-receiving surfaces 12 said end-portions will be tensioned and, thus, have a normal tendency to press upwardly, as illustrated in full and dotted lines in Fig. 4. On the other hand, the rod is, in the forms of structure shown in Figs. 1 and 2, sustained by the bearing 4. The upward pressing tendency of the end-portions, therefore, serves to hold the rod firmly in its bracket-bearing 4 though not so rigidly as to interfere with the free longitudinal operation of the rod. It will thus be seen that the rod is yieldingly engaged by the end-portions at spaced-apart points and, also, sustained intermediate of those points by the bracket-bearing. The rod is, therefore, engaged by the structure at at least three distinct points, and the clip tends, at its ends, to press upwardly. In this way, the clip holds the rod against any lateral movement and vibration while permitting its free sliding movement.

In the form of device illustrated in Fig. 1, where the clip is unsecured to, but rests upon, the bracket, the clip may be positioned in operating engagement with the brake-rod 5 without the use of tools, with great expedition, and without disturbing the bracket 1 in any way. And the last-mentioned statement is also applicable to the form of structure illustrated in Fig. 2. There, however, the clip is secured to the bracket by a bolt 13.

In some instances, it may be desirable to form the clip integral with the bracket, and such an arrangement is illustrated in Fig. 3. In this exemplification of the structure, I preferably omit the bracket-bearing 4, shown in the other forms of devices, and construct the central body-portion 14 of the clip with a downwardly curved bearing-section 15. In this instance, the rod 5 is engaged at three distinct, spaced-apart points, the bearing-parts 17 of the end-sections 18 having the aforementioned normal tendency to force the rod upwardly and which tendency is counteracted by the central bearing-portion 15.

In practice, usually, I prefer to market the clip, itself, as an article of manufacture approximately in the form shown in Fig. 4; but, I may also market the clip, combined with the bracket—in the form shown in Figs. 1 to 3—as a complete article of manufacture.

From the foregoing, it will be perceived that I have succeeded in presenting an anti-rattling device which is well adapted to achieve the several objects and ends in view. It is exceedingly simple and compact in form and (as exemplified in Figs. 1, 2 and 4) is peculiarly designed to be applied to and removed from a brake-rod and its sustaining bracket without disturbing these parts at all.

As many changes can be made in this construction and its embodiment varied to a considerable extent without departing from the spirit of the invention, it is intended that all matter contained in the foregoing description and shown in the accompanying drawings shall be interpreted as illustrative and not in a limiting sense.

What I claim is:

1. An anti-rattling device including a normally bowed, elongated clip of resilient material and comprising a central body-portion and oppositely-extended end-portions formed with curved end-sections and adapted to engage with and be tensioned by a member sustained thereby; in combination with a rod and clip-sustaining bracket juxtaposed to the body-portion of the clip and engaged thereby; and a member extending longitudinally of said clip and engaging it at its extremities and also engaging said bracket intermediate of its points of engagement with the clip.

2. As an article of manufacture, an anti-rattling device comprising a clip of resilient material and including a body-portion having a bracket-engaging section, and an end-portion bent away from the plane of the body-portion and having a rod-engaging portion occupying a plane unalined with the bracket-engaging section of the body-portion.

3. An anti-rattling device including a clip of resilient material and provided with a body-portion and an extended end-portion adapted to engage with and be tensioned by a rod extending longitudinally thereof; in combination with a rod-sustaining bracket formed with an eye and sustaining said clip.

In testimony whereof I affix my signature in presence of two witnesses.

BECKER C. KNUDSEN.

Witnesses:
D. H. SHEPARD,
J. E. FINK.